United States Patent [19]

Phan et al.

[11] Patent Number: 4,777,222

[45] Date of Patent: Oct. 11, 1988

[54] PREPARATION OF DIFFERENTIALLY DYEABLE POLYAMIDE HAVING N-HALOAMINE END GROUPS AND AMINO END GROUPS

[75] Inventors: Xuan T. Phan, Lancaster; Paul J. Shannon, Millersville; Anne L. Schwartz, Columbia, all of Pa.

[73] Assignee: Armstrong World Industries, Inc., Lancaster, Pa.

[21] Appl. No.: 60,227

[22] Filed: Jun. 10, 1987

Related U.S. Application Data

[62] Division of Ser. No. 828,866, Feb. 12, 1986, Pat. No. 4,722,979, which is a division of Ser. No. 667,008, Nov. 1, 1984, Pat. No. 4,603,178.

[51] Int. Cl.$^4$ ............................................. C08G 69/48
[52] U.S. Cl. ...................................... 525/420; 522/164
[58] Field of Search ........................ 522/164; 525/420

[56] References Cited

U.S. PATENT DOCUMENTS 4,603,178  7/1986  Phan et al. ........................ 525/420

Primary Examiner—Harold D. Anderson

[57] ABSTRACT

A method for producing a differentially dyeable polyamide is disclosed. Polyamides produced according to the process of this invention will have distinct areas thereon that show varying degrees of receptivity to acid dyes and can thereby be differentially dyed using a single dyebath.

12 Claims, No Drawings

PREPARATION OF DIFFERENTIALLY DYEABLE POLYAMIDE HAVING N-HALOAMINE END GROUPS AND AMINO END GROUPS

CROSS-REFERENCE TO RELATED APPLICATION

This is a division of application Ser. No. 828,866, filed Feb. 12, 1986. U.S. application No. 828,866 is now issued as U.S. Pat. No. 4,722,979 and in turn was a division of Ser. No. 667,008, filed Nov. 1, 1984, presently issued as U.S. Pat. No. 4,603,178.

Polyamide textile materials, in particular nylon fibers and yarns, are of great value in the textile industry. Many such commercially available polyamide textile materials are receptive to acid, or, as they are otherwise known, anionic dyes.

Polyamides are normally dyed with acid dyes by forming an ionic bond between the dyes and the protonated terminal amine groups ($-NH_3+$) (which are also known as the polyamide's "free amines" or "free amine end groups,") present in the polyamide polymer chain. Other commercially available polyamide textile materials show limited or no receptivity to acid dyes. A manufacturer who utilizes both types of textile materials would at times, depending on his production demands, find it advantageous to be able to convert an acid dyeable textile material to a non- or limit acid dyeable textile material and therefore be able to use one polyamide textile material for a number of purposes. Thus, it is desirable to have a method of decreasing an acid-dyeable polyamide textile materials affinity for acid dyes. It is known that the degree of acid dye uptake depends upon the number of free amine end groups available along the polyamide chain and, further, that the dye uptake of the polyamide can be decreased by changing at least some of these free amine ends into an amine derivative that is both inert to acid dyes and stable under normal dye bath conditions (e.g., boiling aqueous dye bath at low pH, exposure time up to 1 hour).

The invention contemplates differentially dyeing a polyamide. The invention is based in part on the unexpected discovery that polyamide articles that are treated with N-halogenating agents will show a reduced affinity for acid dyes. It has been discovered that, under the proper reaction conditions, such N-halogenating agents will react with a polyamide free amine ends to thereby form N-haloamines, which are not effective acid dye receptor sites. In one embodiment of the invention, at least some of such free amine ends, in selected areas of the polyamide, are reacted with a N-halogenating agent to thereby form N-haloamines. The resulting polyamide will be differentially dyeable in that it will have defined areas that will display differing affinities for acid dyes. A second embodiment of the invention comprises first providing a polyamide which has been treated with an N-halogenating agent so that at least some of the polyamide's free amine ends have been converted to N-haloamines. Thereafter, at least some of the "converted" free amine ends are then regenerated in selected areas of the polyamide to thereby produce an article that has areas containing regenerated free amines (hereinafter referred to as "regenerated areas") and areas that contain at least some halogenated amines (hereinafter referred to as "halogenated areas") with the end result that these will be greater acid dyeability in the regenerated areas of the article than in the halogenated area. Thus, the polyamide will exhibit a significant degree of differential acid dyeing. By utilizing either embodiment, a practitioner of this invention can develop a patterned multi-shaded effect on a polyamide article while using only one type of fiber and only one dye bath.

Any conventional polyamide textile article may be differentially dyed according to the process of the present invention. Examples of suitable polyamides include carpets, fabrics, fibers, filaments, yarns, flocks, films (such as those formed via an extrusion process) and the like which are produced from a linear polyamide containing recurring units of the formula:

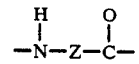

wherein Z is a member of the class consisting of a methylene units independently containing from 1 to about 20 carbon atoms or a linear polyamide of the formula:

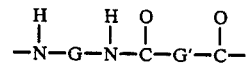

wherein G and G' are methylene units independently containing from 1 to about 20 carbon atoms. Particularly suitable polyamides include nylon polymers such as nylon 66, a condensation product of adipic acid and hexamethylenediamine; nylon 6, a polymer of caprolactam; nylon 4, which is based on butyrolactam (2-pyrrolidone); and nylon 610, which is obtained by condensation of sebacic acid and hexamethylenediamine.

In the practice of this invention, any suitable N-halogenating agent can be employed. N-chlorinating agents are, however, the N-halogenating agents of choice.

Suitable N-chlorinating agents include hypochlorous acid, chlorine gas, t-butyl hypochlorite, N-chlorosuccinimide, N-chloroacetamide, metallic salts of hypochlorous acid such as sodium hypochlorite, potassium hypochlorite, calcium hypochlorite, or barium hypochlorite; and the like.

Other suitable N-halogenating agents include N-brominating agents such as N-bromosuccinimide, t-butyl hypobromite, sodium hypobromite and bromine.

It should be noted that hypochlorous acid is highly unstable. Accordingly, in one embodiment of this invention, hypochlorous acid is generated in situ on the polyamide article by the reaction of an aqueous solution of a metallic salt of hypochlorous acid such as those set forth above, and a weak acid. The aqueous solution of a metallic salt of hypochlorous acid should contain from about 0.1 to about 5 percent by weight chlorine.

Any suitable weak acid can be used which, when reacted with a metallic salt of hypochlorous acid, results in the formation of hypochlorous acid. Particularly suitable weak acids include acetic acid, acrylic acid, and the like.

To prepare the polyamide of this invention, any conventional polyamide article (which has, optionally, been scoured such as by being solvent and water washed at high temperatures, to thereby remove any previous coating, such as fiber dressing or spinning aids) is treated, either selectively according to the first embodiment of this invention or non-selectively, according to the second embodiment, with an N-halogenating agent.

The polyamide may be treated with the N-halogenating agent in any manner that is convenient to the individual practitioner of the invention and which is consistent with the embodiment of the invention being utilized. For example, the polyamide may be completely or partially immersed in a solution containing an N-halogenating agent. Alternatively, such a solution may be sprayed or brushed on a polyamide. In another method (which is particularly useful in the first embodiment of this invention), the halogenating agent may be applied to a polyamide in the form of a paste comprising the halogenating agent in a thickening agent, followed by steam treating the sample for a short period of time. This latter procedure is also very useful when the polyamide is a nylon loop carpet.

The degree to which a polyamide's free amine sites will be converted to N-haloamines will be dependent on a variety of factors, including the specific N-halogenating agent being utilized, the concentration of the N-halogenating gent, the temperature of the reaction solution, and the duration of the halogenation reaction. These factors can, of course, be adjusted by the practitioner of the invention as a way to control the final color pattern on the dyed article.

It has been discovered that high reaction temperatures, i.e., above about 80° C., will generally facilitate the halogenation of the polyamide's free amine ends. Generally, the halogentation is most conveniently run at 100° C., the boiling point of water.

The halogenation of the polyamide's free amine sites can also be facilitated, especially at lower reaction temperatures, by including a small amount of a compatible anionic surface active agent with the halogenating agent. Examples of suitable anionic surface agents include, but are not limited to, American Cyanamid's Aerosol OT-75, a sodium dodecyl sulfate anionic surface agent, and sodium lauryl sulfate.

In the second embodiment of the invention, the preferred method of regenerating the free amine ends is by exposing selected areas of the polyamide to UV radiation, such as through a mask or screen. The free amine ends can also be regenerated by chemical means, such as by contacting selected areas of the article with an effective reducing agent for the N-haloamines. Examples of suitable reducing agents include, but are not limited to, sodium bisulfite, ammonium hydroxide, sodium thiosulfite, sodium thiosulfate, sodium sulfide, sodium iodide, and hydroxylamine hydrochloride.

The reducing agent can be contacted with the polyamide article in any manner that is convenient to the practitioner of the invention. For example, if the polyamide is a carpet, the reducing agent can be formulated into a paste and thereafter be applied to the carpet. Alternatively, the reducing agent can be printed on the polyamide or sprayed thereon through a mask or screen. After being treated with the reducing agent and prior to being dyed, the polyamide should be cleaned to remove any unreacted reducing agent and any carrier material in which the reducing agent was incorporated.

When the free amine ends are regenerated via exposure to UV radiation, the rate of regeneration will generally be a function of parameters such as UV irradiation time, the intensity of the light source, the distance of the UV light source from the material, the output of wavelength of the UV lamp, and/or the degree of N-halogenation of the polyamide amide. In any event, it should be noted that it is not necessary to achieve the complete regeneration of the free amine ends in order to obtain a differentially dyed effect on the polyamide article. However, the contrast, after dyeing, between those areas exposed to UV and the unexposed areas becomes greater with the increased regeneration of the free amine sites.

Any UV light source is suitable for regenerating the face amine ends on the treated material, although light sources with both visible and ultraviolet output are preferred. Examples of suitable light sources include Xenon lamps and mercury lamps. The treated sample will also regenerate its free amine ends in the presence of sunlight alone, although the exposure time needed to regenerate the free amine is considerably longer in sunlight than with standard UV light emitting lamps. Therefore, prior to dyeing care should be taken not to unintentionally expose the polyamide article to sunlight for an extended period of time to insure that free amine ends will not be regenerated in areas of the article that were not exposed to UV radiation and to thereby prevent the elimination or diminishing of the differential dyeing effect.

When the free amine ends are regenerated via a chemical reduction procedure, the rate of regeneration is a function of parameters such as type and concentration of reducing agent, reaction temperature, and/or exposure time. Again, it is not necessary to achieve the complete regeneration of the free amine ends to achieve a differentially dyed effect between the regenerated and chlorinated areas of the polyamide. However, after the chemical reduction and before the article is dyed, care should be taken not to expose the article to any source of UV light for an appreciable length of time or, as mentioned above, the differential dyed effect between the halogenated and regenerated areas will be diminished.

EXAMPLE 1

This example illustrates how the N-halogenation of the free amine sites on a polyamide article results in the reduction of acid dye uptake by the article.

A loop sample (6"×6") of nylon 66 yarn (Dupont 1100/68 746 Brt, approximately 0.5 g each sample) was scoured by washing in methanol (3 times) and in water (80° C., 3 times). The sample was then air dried. The sample was then dipped for one minute into a bath containing 20 ml boiling commercial Clorox (5.25% sodium hypochlorite) and was then washed with deionized water. The sample was then immersed in a dye bath at 100° C. for 1 hour. The dye bath was prepared by dissolving 0.37 grams of CI Acid Red I (Sandolan Rhodine E-2GL, Sandoz Corporation) in 500 ml of deionized water with enough citric acid/sodium acetate buffer (0.15 g citric acid and 0.5 g sodium acetate) to maintain the pH of the dye bath in the range of 5.1. The sample was then rinsed with water, rendered substantially anhydrous by being air dried and stored overnight over phosphorous pentoxide in a dessicator under high vacuum.

The dye uptake (grams of dye per gram of fiber) of the sample was determined by dissolving approximately 0.2 g of the dyed fiber in 90% reagent-grade formic acid (100 ml) and measuring the absorbance of the resulting solution at 540 nm. The dye uptake was calculated by comparing the absorbance with that of a standard solution containing anhydrous CI Acid Red I in 90% formic acid ($A_{540}$=0.422 for a standard solution containing 1 mg in dye in 100 ml of 90% formic acid).

Using this technique it was found that the dye uptake of the thus treated sample was 2.39 mg dye/g of fiber. By contrast, the dye uptake of an untreated control sample which was dyed in an identical fashion 10.35 mg/g of fiber.

EXAMPLE 2

The procedure of Example 1 was repeated, except that the sample was boiled in Clorox for only 15 seconds. The dye uptake of the thus treated sample was 4.25 mg/g of fiber (42 wt %) of the dye uptake of the untreated control.

EXAMPLES 3-5

These examples further show the relationship between treatment time and treatment temperature of the amine N-halogenation. In these examples all the procedures were similar to those utilized in Example 1. The dye uptake of each sample was measured and compared to the Control. This data is set forth in Table 1. For comparison purposes, data for Examples 1 and 2 are repeated in Table 1:

TABLE 1

| Example | Treatment Conditions | Treatment Time | Temp. (°C.) | Dye Uptake (mg/g fiber) | % Dye Uptake Compared to Control |
|---|---|---|---|---|---|
| Control | — | — | — | 10.35 | 100 |
| 3 | Clorox | 5 min. | 25 | 10.35 | 100 |
| 4 | Clorox + 0.1% OT-75 anionic surface active agent | 5 min. | 25 | 8.96 | 87 |
| 2 | Clorox | 15 sec. | 100 | 4.25 | 42 |
| 1 | Clorox | 1 min. | 100 | 2.39 | 23 |
| 5 | Clorox | 5 min. | 100 | 1.12 | 11 |

These examples illustrate that, with other parameters being equal, (1) an increase in treatment time will result in a decrease in dye uptake and (2) an increase in treatment temperature will also result in a decrease in dye uptake. In both instances the decrease in dye uptake can be attributed to the conversion of some free amine acid dye receptor sites to N-chloroamines.

EXAMPLE 6

In this example the procedure of Example 1 was followed exactly, except that the N-halogenated polyamide was not immediately dyed but rather was first dipped for 1 minute into a bath containing 20 ml of boiling 5% aqueous sodium bisulfite.

The sample, upon being dyed, showed a dye uptake of 4.26 mg dye/g fiber, which is 42% of the untreated control. By contrast, the sample of Example 1 had 23% dye uptake of the control. This illustrates that treating the polyamide with a sodium bisulfite reducing agent resulted in the regeneration of some of the free amine sites which had previously been converted to N-chloroamines.

EXAMPLES 7-12

In these examples, the nylon 66 loop carpet samples were separately boiled in Clorox for specified periods of time according to the procedures set forth above. The amounts of dye uptake were measured for each sample. The samples were then covered with a mask and irradiated under UV light (PPG Industries, Inc., Model QC1202) at the intensity specified in Table 2. The samples were then dyed and dye uptake measurements were taken for each sample. The data is set forth in Table 2, along with the percent increase in dye uptake between the irradiated and non-irradiated areas.

TABLE 2

| Example No. | Treatment Time Clorox, 100° C. | Irradiation (Joules/cm$^2$) | Dye Uptake (mg/g Fiber) | % Dye Uptake Compared to Control |
|---|---|---|---|---|
| Control | — | — | 10.35 | 100 |
| 7 | 15 sec. | Unexposed | 4.25 | 41 |
|   | 15 sec. | 3.30 | 5.45 | 53 |
| 8 | 1 min. | Unexposed | 2.46 | 24 |
|   | 1 min. | 1.65 | 3.67 | 35 |
| 9 | 1 min. | Unexposed | 2.38 | 23 |
|   | 1 min. | 3.30 | 4.25 | 41 |
| 10 | 1 min. | Unexposed | 2.35 | 23 |
|    | 1 min. | 4.95 | 4.64 | 45 |
| 11 | 1 min. | Unexposed | 2.41 | 23 |
|    | 1 min. | 9.90 | 5.31 | 51 |
| 12 | 5 min. | Unexposed | 1.12 | 11 |
|    | 5 min. | 3.30 | 2.48 | 24 |

These examples illustrate that exposing the N-chlorinated polyamide to UV irradiation will result in a regeneration of some free amine sites which results in an increase in dye uptake.

EXAMPLE 13

The procedure of Example 1 was repeated exactly, except that a carpet loop sample of nylon 6 was utilized. It was found that the dye uptake of the treated sample was 2.14 mg dye/g of fiber. This was found to be 21 wt % of the dye uptake of an untreated control sample which was identically dyed and which had a dye uptake of 10.08 mg dye/g fiber.

EXAMPLE 14

In this example the procedure of Example 13 was followed exactly, except that the N-chlorinated polyamide was not immediately dyed but was first dipped for 1 minute into a bath containing 25 ml of boiling 5% aqueous sodium bisulfite. The sample, upon being dyed, showed a dye uptake of 4.64 mg dye/g fiber which is 46% of the untreated control specified in Example 13.

EXAMPLES 15-17

These examples repeat the procedures of Examples 7-12, except that carpet loop samples of nylon 6 were utilized. The specific experimental conditions and the resulting data are set forth in Table 3.

TABLE 3

| Example No. | Treatment Time Clorox, 100° C. | Irradiation (Joules/cm²) | Dye Uptake (mg/g Fiber) | % Dye Uptake Compared to Control |
|---|---|---|---|---|
| Control | — | — | 10.08 | 100 |
| 13 | 1 min. | Unexposed | 2.07 | 21 |
|  | 1 min. | 1.65 | 3.37 | 33 |
| 14 | 1 min. | Unexposed | 2.25 | 22 |
|  | 1 min. | 3.30 | 4.33 | 43 |
| 15 | 1 min. | Unexposed | 2.11 | 21 |
|  | 1 min. | 4.95 | 4.94 | 49 |

EXAMPLE 18

Nylon 66 loop carpet samples (6 sq. inches) were first scoured with methanol and then treated with boiling Clorox for 3 minutes. The treated samples were then irradiated (8 joules/cm²) through a mask so that there were both exposed and unexposed areas on the surface of the samples. The samples were then dyed with an equal parts mixture of three acid dyes: Tectilon Orange 3G, Tectilon Red 2R and Tectilon Blue 4R. After standing at room temperature under room light for 1 week, the UV absorption of the carpet samples was measured. No fading from both the exposed and unexposed areas was detected.

EXAMPLE 19

Nylon 66 loop carpet samples (6 sq. inches) were scoured with methanol. Sodium hypochlorite was then applied to the carpet in the form of a paste comprising of sodium hypochlorite (5%) in a thickening agent, followed by a steam passing through the treated sample for 5 minutes. The chlorinated sample was then exposed to UV light (3.3 joules/cm²), followed by dyeing with the dye mixture specified in Example 18. The finished products were exposed to room light over a period of one year without showing any visible fading.

EXAMPLE 20

Nylon 66 fiber (approximately 0.5 g) was treated with a solution containing 2% t-butyl hypochlorite (Frinton Laboratories) in methanol (100 ml) at room temperature for 5 minutes. The sample was rinsed with methanol, water, then immersed in a dye bath of Acid Red I at 100° C. for 1 hour.

The dye uptake of the thus treated sample was 1.84 mg dye/g fiber. This was found to be 18% of the dye uptake of the untreated control.

EXAMPLE 21

The process of Example 20 was repeated, except that the sample was treated with a solution of 5% N-chlorosuccinamide in 50% aqueous acetonitrile at 60° C. for 1 minute. The dye uptake of the treated sample was 4.05 mg/g fiber, or 39 wt % of the dye uptake of the control.

EXAMPLE 22

Approximately two thirds of a nylon 66 loop carpet sample (approximately 16 sq. in.) was boiled gently in Clorox for 1 minute, then rinsed with water.

Roughly half of the N-chlorinated area from the above treatment with Clorox was then boiled gently in 5% aqueous sodium bisulfite solution for 1 minute. The carpet sample was then rinsed with water, and dyed in a manner described above.

The thus treated carpet sample displayed three bands with different shades of color: the top band (untreated control) was deep red, the second band (Clorox treatment only) was light pink, and the third band (by treatment with Clorox followed by sodium bisulfite) was red.

The dye uptake of the first band was 10.80 mg dye/g fiber. The dye uptake of the second band was 2.52 mg dye/g fiber or 23% of the dye uptake of the first band. The dye uptake of the third band was 6.47 mg dye/g fiber or 60% of the dye uptake of the control band.

EXAMPLES 23-24

In example 23, a loop of nylon 66 yarn (approximately 0.5 g) was dipped into a 50:50 aqueous acetonitrile (25 ml) containing 5% N-bromosuccinimide at 60° C. for 1 minute.

The sample was then immersed in a dye bath at 100° C. for 1 hour. The dye bath was prepared by dissolving 0.11 g of CI Acid Red I in 150 ml of deionized water containing 0.045 g of citric acid and 0.15 g of sodium acetate.

The dye uptake of the sample was 4.07 mg/g of fiber or 38.5% of the dye uptake of the control (the control sample had a dye uptake of 10.55 mg/g fiber).

For example 24, the procedure of example 23 was repeated, except that the sample was boiled in 5% aqueous N-bromosuccinimide for 1 minute. The dye uptake of the thus treated sample was 9% of the dye uptake of the untreated control.

What is claimed is:

1. A method for producing a differentially dyeable polyamide where at least some free amino end group moieties of said polyamide are reacted with an N-halogenating agent and thereby converted to N-halomine end group moieties, said method comprising: regenerating free amino end group moieties from the N-haloamine end group moieties in selected areas of the polyamide by exposing these selected areas of the polyamide to an amount of UV radiation sufficient to convert the N-haloamine end group moieties to free amino end group moieties in the said exposed, selected areas, to thereby produce a polyamide that has one or more areas containing N-haloamine end group moieties which are not receptive to acid dyes and one or more areas containing said regenerated free amino end group moieties which are receptive to acid dyes.

2. The method as described in claim 1 wherein the N-halogenating agent is an N-chlorinating agent.

3. The method as described in claim 1 wherein the N-halogenating agent is an N-brominating agent.

4. The method of claim 1 wherein the UV radiation is from a source having both visable and ultraviolet output.

5. The method as described in claim 2 wherein the N-chlorinating agent is: hypochlorous acid, chlorine gas, t-butyl hypochlorite, N-chlorosuccinimide, N-chloroacetamide, or metallic salts of hypochlorous acid.

6. The method of claim 3 wherein the N-brominating agent is: N-bromosuccinimide, t-butyl hypobromite, sodium hypobromite, or bromine.

7. The method as described in claim 4 wherein the N-halogenating agent is an N-chlorinating agent.

8. The method as described in claim 4 wherein the N-halogenating agent is an N-brominating agent.

9. The method as described in claim 1 wherein the N-halogenating agent is applied to the polyamide in the form of a paste which comprises the N-halogenating agent and a thickener.

10. The method of claim 1 wherein the polyamide is a nylon loop carpet.

11. The method of claim 10 wherein the N-halogenating agent is applied to the carpet in the form of paste comprising the N-halogenating agent and a thickener.

12. The method of claim 1 wherein the free amino end group moieties are reacted with the N-halogenating agent in the presence of an anionic surface active agent.

* * * * *